(12) United States Patent
Brazier

(10) Patent No.: US 6,686,952 B1
(45) Date of Patent: Feb. 3, 2004

(54) SURVEILLANCE SECURITY SYSTEM

(76) Inventor: Darren R. Brazier, 5830 145th St. NE., Marysville, WA (US) 98271

( * ) Notice: Subject to any disclaimer, the term of this patent is extended or adjusted under 35 U.S.C. 154(b) by 307 days.

(21) Appl. No.: 09/849,432

(22) Filed: May 4, 2001

(51) Int. Cl.[7] .............................. H04N 7/18; H04N 9/47
(52) U.S. Cl. ...................... 348/143; 348/155; 348/162; 348/163; 348/169
(58) Field of Search ................................ 348/143, 155, 348/162, 163, 169; 340/815.49

(56) References Cited

U.S. PATENT DOCUMENTS

| | | |
|---|---|---|
| 5,107,120 A | 4/1992 | Tom |
| D342,337 S | 12/1993 | Wen |
| 5,299,971 A * | 4/1994 | Hart .......................... 446/484 |
| 5,381,323 A | 1/1995 | Osteen et al. |
| 5,402,167 A * | 3/1995 | Einbinder .................. 348/152 |
| 5,473,368 A * | 12/1995 | Hart ........................... 348/155 |
| 5,532,680 A | 7/1996 | Ousborne |
| 5,726,629 A | 3/1998 | Yu |
| 6,100,803 A * | 8/2000 | Chang ........................ 340/567 |
| 6,215,396 B1 * | 4/2001 | Script ...................... 340/545.1 |
| 6,498,564 B2 * | 12/2002 | Oda ........................... 340/567 |
| 6,507,366 B1 * | 1/2003 | Lee ............................. 348/352 |

* cited by examiner

Primary Examiner—Andy Rao
Assistant Examiner—Charles E Parsons

(57) ABSTRACT

A surveillance security system for detecting and monitoring movement upon one's property. The surveillance security system includes a base housing being adapted to be mounted upon a bracket which is attached to a building structure; and also includes a support base being disposed in the base housing and having a plurality of disc members; and further includes a pedestal assembly being mounted upon the support base; and also includes a monitoring assembly being mounted upon the support base and upon the pedestal assembly.

5 Claims, 4 Drawing Sheets

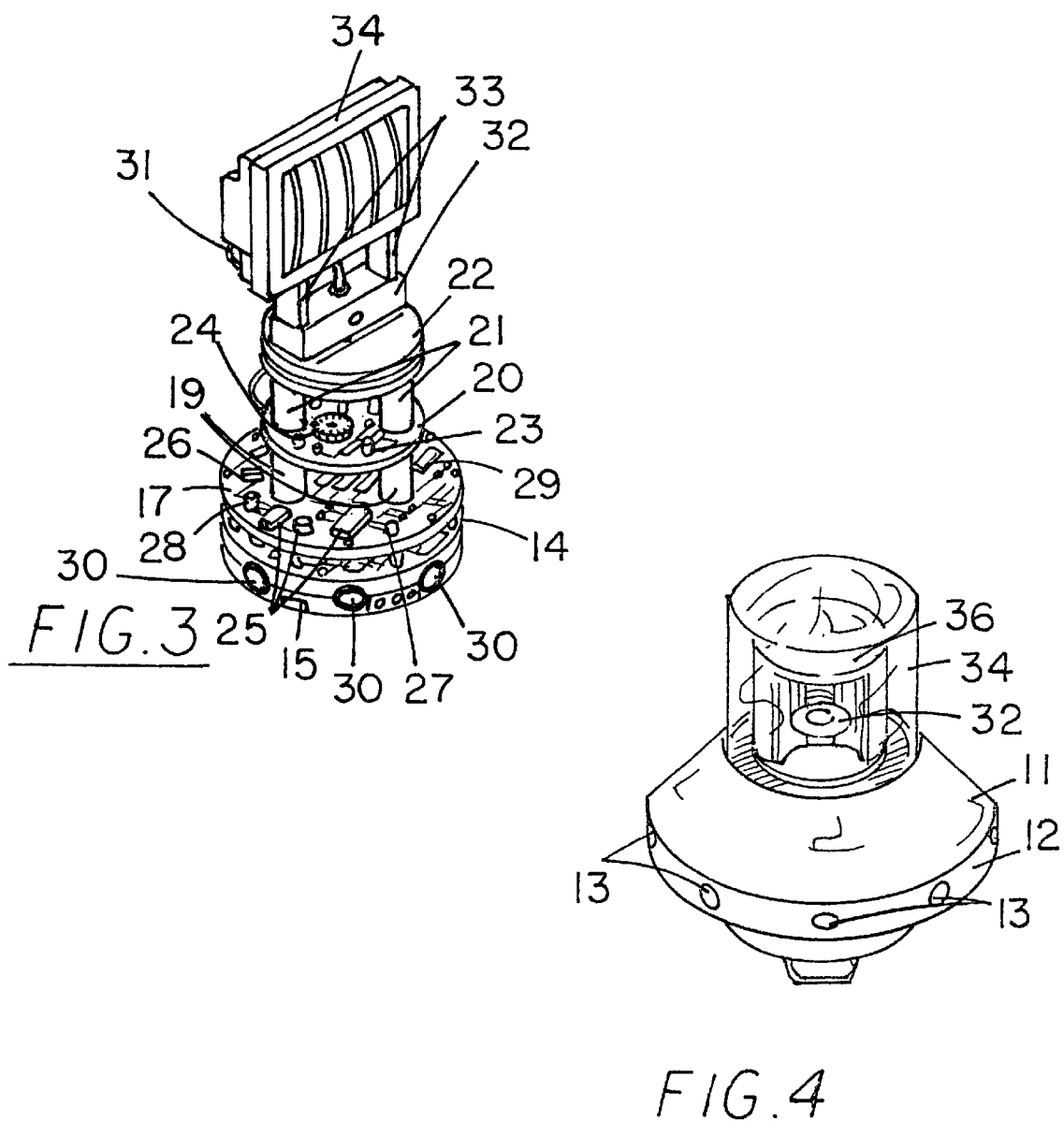

SURVEILLANCE SECURITY SYSTEM

BACKGROUND OF THE INVENTION

1. Field of the Invention

The present invention relates to surveillance systems and more particularly pertains to a new surveillance security system for detecting and monitoring movement upon one's property.

2. Description of the Prior Art

The use of surveillance systems is known in the prior art. More specifically, surveillance systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,299,971; 5,107,120; 5,726,629; 5,532,680; 5,381,323; and U.S. Pat. No. Des. 342,337.

While these devices fulfill their respective, particular objectives and requirements, the aforementioned patents do not disclose a new surveillance security system. The inventive device includes a base housing being adapted to be mounted upon a bracket which is attached to a building structure; and also includes a support base being disposed in the base housing and having a plurality of disc members; and further includes a pedestal assembly being mounted upon the support base; and also includes a monitoring assembly being mounted upon the support base and upon the pedestal assembly.

In these respects, the surveillance security system according to the present invention substantially departs from the conventional concepts and designs of the prior art, and in so doing provides an apparatus primarily developed for the purpose of detecting and monitoring movement upon one's property.

SUMMARY OF THE INVENTION

In view of the foregoing disadvantages inherent in the known types of surveillance systems now present in the prior art, the present invention provides a new surveillance security system construction wherein the same can be utilized for detecting and monitoring movement upon one's property.

The general purpose of the present invention, which will be described subsequently in greater detail, is to provide a new surveillance security system which has many of the advantages of the surveillance systems mentioned heretofore and many novel features that result in a new surveillance security system which is not anticipated, rendered obvious, suggested, or even implied by any of the prior art surveillance systems, either alone or in any combination thereof.

To attain this, the present invention generally comprises a base housing being adapted to be mounted upon a bracket which is attached to a building structure; and also includes a support base being disposed in the base housing and having a plurality of disc members; and further includes a pedestal assembly being mounted upon the support base; and also includes a monitoring assembly being mounted upon the support base and upon the pedestal assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new surveillance security system which has many of the advantages of the surveillance systems mentioned heretofore and many novel features that result in a new surveillance security system which is not anticipated, rendered obvious, suggested, or even implied by any of the prior art surveillance systems, either alone or in any combination thereof.

It is another object of the present invention to provide a new surveillance security system which may be easily and efficiently manufactured and marketed.

It is a further object of the present invention to provide a new surveillance security system which is of a durable and reliable construction.

An even further object of the present invention is to provide a new surveillance security system which is susceptible of a low cost of manufacture with regard to both materials and labor, and which accordingly is then susceptible of low prices of sale to the consuming public, thereby making such surveillance security system economically available to the buying public.

Still yet another object of the present invention is to provide a new surveillance security system which provides in the apparatuses and methods of the prior art some of the advantages thereof, while simultaneously overcoming some of the disadvantages normally associated therewith.

Still another object of the present invention is to provide a new surveillance security system for detecting and monitoring movement upon one's property.

Yet another object of the present invention is to provide a new surveillance security system which includes a base housing being adapted to be mounted upon a bracket which is attached to a building structure; and also includes a support base being disposed in the base housing and having a plurality of disc members; and further includes a pedestal assembly being mounted upon the support base; and also includes a monitoring assembly being mounted upon the support base and upon the pedestal assembly.

Still yet another object of the present invention is to provide a new surveillance security system that is easy and convenient to install and use.

Even still another object of the present invention is to provide a new surveillance security system that allows a user to carefully and completely monitor and record unauthorized activities upon one's property.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is another perspective view of the present invention.

FIG. 4 is a perspective view of a second embodiment of the present invention.

DESCRIPTION OF THE PREFERRED EMBODIMENT

Figure 1:
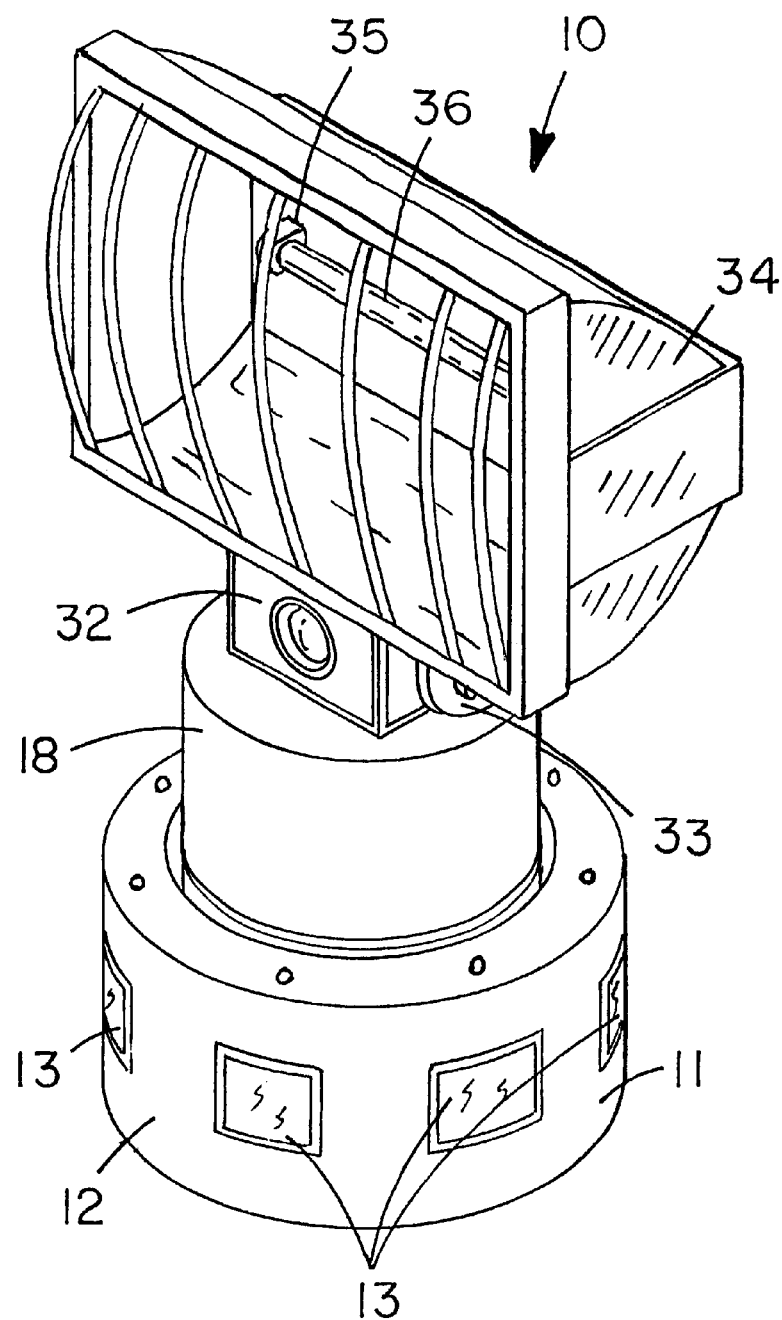
FIG. 1 is a perspective view of a new surveillance security system according to the present invention.
Figure 2:
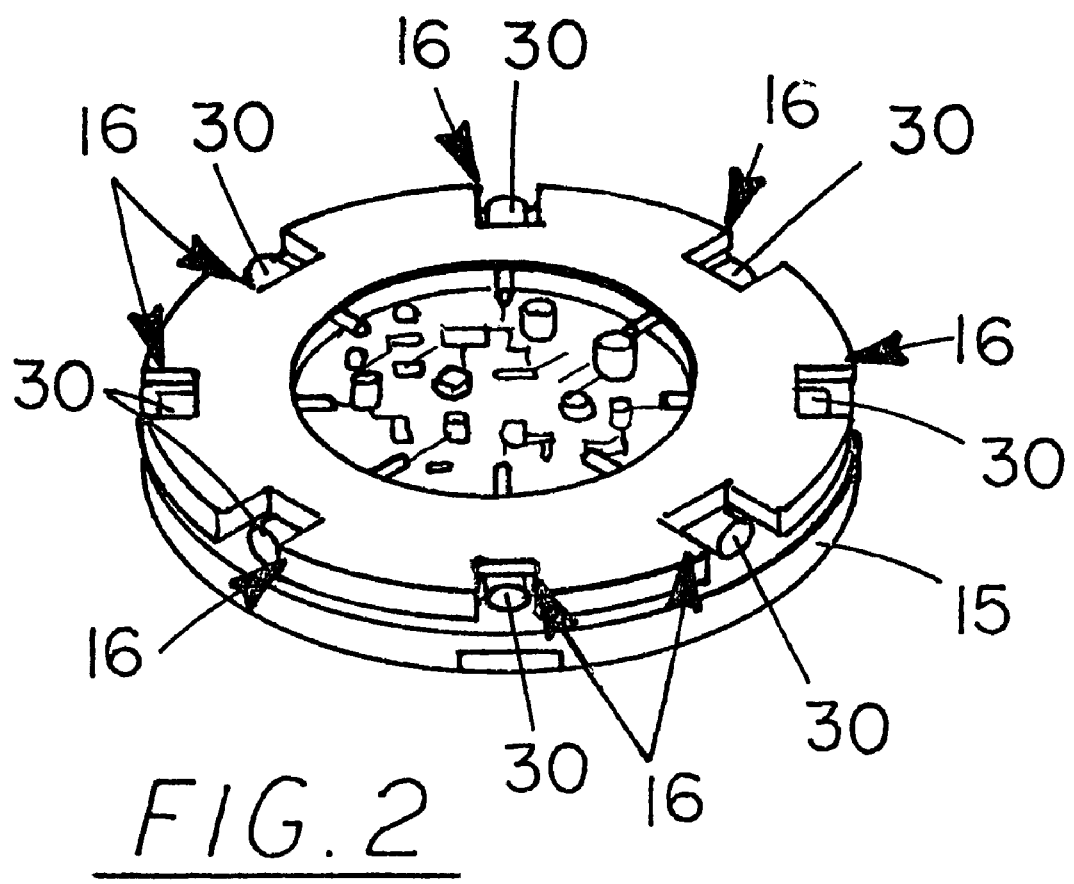
FIG. 2 is a detailed perspective view of the present invention.
Figure 5:
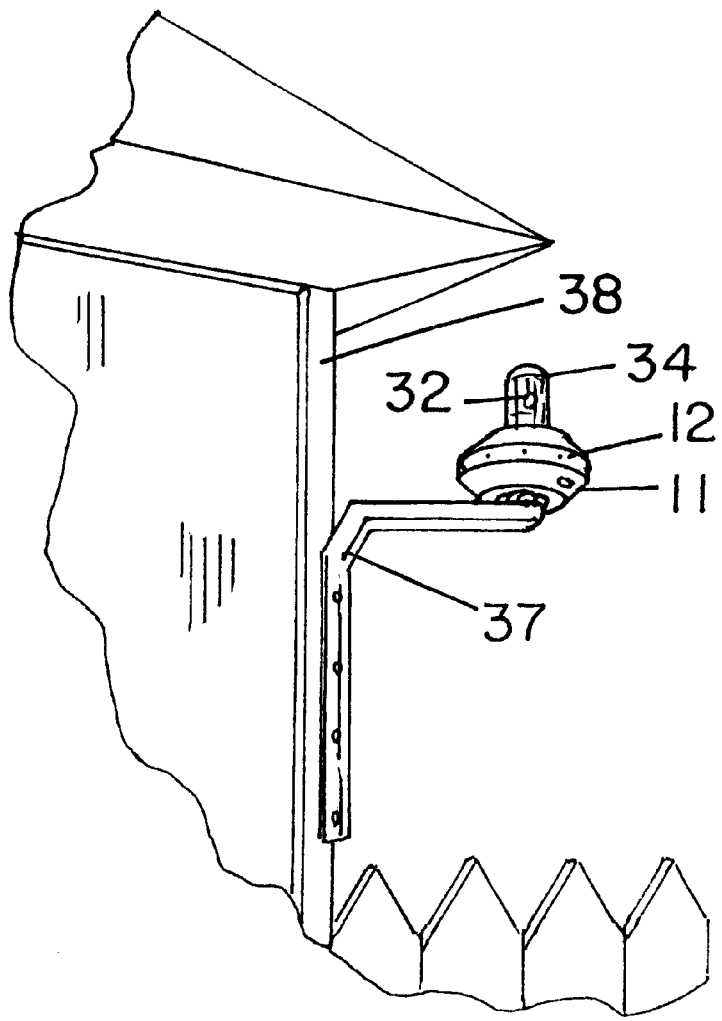
FIG. 5 is a perspective view of the second embodiment of the present invention shown in use.

With reference now to the drawings, and in particular to FIGS. 1 through 5 thereof, a new surveillance security system embodying the principles and concepts of the present invention and generally designated by the reference numeral 10 will be described.

As best illustrated in FIGS. 1 through 5, the surveillance security system 10 generally comprises a base housing 11 being adapted to be mounted upon a bracket member 37 which is attached to a building structure 38. The base housing 11 includes a plurality of windows 13 being spaced apart and being conventionally disposed in a side wall 12 thereof. A support base 14 is disposed in the base housing 11 and has a plurality of disc members 15,17. The disc members 15,17 include a sensor disc member 15 having a plurality of slots 16 being spaced along and being disposed in a circumference thereof and being aligned with the windows 13 in the base housing 11. The disc members 15,17 also include a circuit board 17 being conventionally mounted upon the sensor disc member 15.

A pedestal assembly is mounted upon the support base 14. The pedestal assembly includes a housing member 18 being rotatably mounted upon the base housing 11, and further includes first support members 19 being securely and conventionally mounted upon the circuit board 17 and being disposed in the housing member 18, and also includes a lower platform 20 being conventionally mounted upon the first support members 19 and being spaced above the circuit board 17 and being disposed in the housing member 18, and further includes second support members 21 being conventionally mounted upon the lower platform 20 and being disposed in the housing member 18, and also includes an upper platform 22 being rotatably mounted upon the second support members 21 and being disposed in the housing member 18, and further includes a motor 23 being conventionally mounted upon the lower platform 20 and being adapted to be connected to a power source, and also includes a gear 24 being conventionally attached to the motor 23 and being engaged to the upper platform 22 for the rotation thereof.

A monitoring assembly is mounted upon the support base 14 and upon the pedestal assembly. The monitoring assembly including a plurality of motion sensors 30 being conventionally disposed in the slots 16 in the sensor disc member 15 and being conventionally connected to the motor 23, and also includes audio receiving and recording components 25 being conventionally disposed upon the circuit board 17, and further includes an activity light 28 being conventionally disposed upon the circuit board 17, and also includes a computer jack 29 being conventionally disposed upon the circuit board 17 and being adapted to connect to a computer, and further includes a video camera 32 being conventionally mounted upon the upper platform 22 and being adapted to be connected to the power source and being conventionally connected to the computer jack 29, and also includes a light-emitting assembly being mounted upon the video camera 32. The audio receiving and recording components 25 include a microphone 26 and a speaker jack 27. The light-emitting assembly includes brackets 33 being conventionally mounted upon the video camera 32, and also includes a light housing 34 being conventionally mounted upon the brackets 33, and further includes a light socket 35 being conventionally disposed in the light housing 34, and also includes a light-emitting member 36 being removably attached to the light socket 35.

In use, the user energizes the surveillance security system 10, and upon the sensor members 30 detecting movement about the surveillance security system 10, the video camera 32 rotates to where the movement is detected and the light-emitting member 36 shines a beam of light upon the movement all of which is being recorded visually and audibly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A surveillance security system comprising:
    a base housing being adapted to be mounted upon a bracket member which is attached to a building structure;
    a support base being disposed in said base housing and having a plurality of disc members;
    a pedestal assembly being mounted upon said support base;
    a monitoring assembly being mounted upon said support base and upon said pedestal assembly;
    wherein said base housing includes a plurality of windows being spaced apart and being disposed in a side wall thereof;
    wherein said disc members includes a sensor disc member having a plurality of slots being spaced along and being disposed in a circumference thereof and being aligned with said windows in said base housing;
    wherein said disc members includes a circuit board being mounted upon said sensor disc member; and
    wherein said pedestal assembly includes a housing member being rotatably mounted upon said base housing, and further includes first support members being securely mounted upon said circuit board and being disposed in said housing member, and also includes a lower platform being mounted upon said first support members and being spaced above said circuit board and being disposed in said housing member, and further includes second support members being mounted upon said lower platform and being disposed in said housing member, and also includes an upper platform being rotatably mounted upon said second support members and being disposed in said housing member, and further includes a motor being mounted upon said lower platform and being adapted to be connected to a power source, and also includes a gear being attached to said motor and being engaged to said upper platform for the rotation thereof.

2. A surveillance security system as described in claim 1, wherein said monitoring assembly includes a plurality of motion sensors being disposed in said slots in said sensor disc member and being connected to said motor, and also includes audio receiving and recording components being disposed upon said circuit board, and further includes an activity light being disposed upon said circuit board, and also includes a jack being disposed upon said circuit board and being adapted to connect to a computer cord, and further includes a video camera being mounted upon said upper platform and being adapted to be connected to the power source and being connected to said jack, and also includes a light-emitting assembly being mounted upon said video camera.

3. A surveillance security system as described in claim 2, wherein said audio receiving and recording components includes a microphone and a speaker jack.

4. A surveillance security system as described in claim 2, wherein said light-emitting assembly includes brackets being mounted upon said video camera, and also includes a light housing being mounted upon said brackets, and further includes a light socket being disposed in said light housing, and also includes a light-emitting member being removably attached to said light socket.

5. A surveillance security system comprising:
    a base housing being adapted to be mounted upon a bracket member which is attached to a building structure, said base housing including a plurality of windows being spaced apart and being disposed in a side wall thereof;
    a support base being disposed in said base housing and having a plurality of disc members, said disc members including a sensor disc member having a plurality of slots being spaced along and being disposed in a circumference thereof and being aligned with said windows in said base housing, said disc members also including a circuit board being mounted upon said sensor disc member;
    a pedestal assembly being mounted upon said support base, said pedestal assembly including a housing member being rotatably mounted upon said base housing, and further including first support members being securely mounted upon said circuit board and being disposed in said housing member, and also including a lower platform being mounted upon said first support members and being spaced above said circuit board and being disposed in said housing member, and further including second support members being mounted upon said lower platform and being disposed in said housing member, and also including an upper platform being rotatably mounted upon said second support members and being disposed in said housing member, and further including a motor being mounted upon said lower platform and being adapted to be connected to a power source, and also including a gear being attached to said motor and being engaged to said upper platform for the rotation thereof; and
    a monitoring assembly being mounted upon said support base and upon said pedestal assembly, said monitoring assembly including a plurality of motion sensors being disposed in said slots in said sensor disc member and being connected to said motor, and also including audio receiving and recording components being disposed upon said circuit board, and further including an activity light being disposed upon said circuit board, and also including a jack being disposed upon said circuit board and being adapted to connect to a computer cord, and further including a video camera being mounted upon said upper platform and being adapted to be connected to the power source and being connected to said jack, and also including a light-emitting assembly being mounted upon said video camera, said audio receiving and recording components including a microphone and a speaker jack, said light-emitting assembly including brackets being mounted upon said video camera, and also including a light housing being mounted upon said brackets, and further including a light socket being disposed in said light housing, and also including a light-emitting member being removably attached to said light socket.

* * * * *